(12) United States Patent
Hwang et al.

(10) Patent No.: US 12,488,001 B2
(45) Date of Patent: Dec. 2, 2025

(54) RULE BASED HINT APPLICATION

(71) Applicant: Snowflake Inc., Bozeman, MT (US)

(72) Inventors: Sangyong Hwang, Sammamish, WA (US); Sourav Sikdar, Houston, TX (US); Li Yan, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/336,426

(22) Filed: Jun. 16, 2023

(65) Prior Publication Data

US 2024/0419666 A1 Dec. 19, 2024

(51) Int. Cl.
*G06F 16/2453* (2019.01)

(52) U.S. Cl.
CPC .............. *G06F 16/24544* (2019.01)

(58) Field of Classification Search
CPC ......... G06F 16/24544; G06F 16/24539; G06F 16/24537; G06F 16/2282
USPC ........................................... 707/714
See application file for complete search history.

(56) References Cited

U.S. PATENT DOCUMENTS

| | | | | |
|---|---|---|---|---|
| 10,592,506 | B1 * | 3/2020 | Thombre | G06F 16/2453 |
| 11,301,451 | B1 * | 4/2022 | Cseri | G06F 16/24568 |
| 11,314,740 | B1 | 4/2022 | Hwang et al. | |
| 11,544,263 | B2 | 1/2023 | Hwang et al. | |
| 2013/0073537 | A1 * | 3/2013 | Simon | G06F 16/24542 |
| | | | | 707/E17.054 |
| 2016/0232207 | A1 * | 8/2016 | Brunel | G06F 16/282 |
| 2018/0276277 | A1 * | 9/2018 | Wang | G06F 16/24544 |
| 2020/0073986 | A1 * | 3/2020 | Purcell | G06F 16/21 |
| 2020/0379963 | A1 * | 12/2020 | Lopes | G06F 16/24542 |
| 2021/0117424 | A1 * | 4/2021 | Yao | G06F 16/24537 |
| 2021/0263913 | A1 * | 8/2021 | Boodman | G06F 16/235 |
| 2021/0342351 | A1 * | 11/2021 | Mathew | G06F 16/24544 |
| 2022/0092069 | A1 * | 3/2022 | Hartsing | G06F 16/24544 |
| 2022/0365933 | A1 * | 11/2022 | Li | G06N 3/042 |
| 2023/0117461 | A1 * | 4/2023 | Pasupuleti | G06F 16/2453 |
| | | | | 707/721 |
| 2023/0315731 | A1 * | 10/2023 | Xu | G06F 16/24537 |
| | | | | 707/714 |

* cited by examiner

*Primary Examiner* — Evan Aspinwall
(74) *Attorney, Agent, or Firm* — Schwegman Lundberg & Woessner, P.A.

(57) ABSTRACT

The subject technology receives a first query plan corresponding to a query, the first query plan comprising a set of join nodes, and a join order hint of a target query plan, each join node of the target query plan associated with a hint. The subject technology generates a second query plan to correct a set of vertical positions of a set of terminal nodes of the first query plan following the join order hint of the target query plan. The subject technology generates a third query plan to correct a set of lateral positions of the set of terminal nodes of the second query plan following the join order hint of the target query plan. The subject technology, for each join node from the set of join nodes of the third query plan, indicates that each join node has been hinted. The subject technology generates, after each join node of the third query plan has been indicated as being hinted, the target query plan based at least in part on the third query plan.

26 Claims, 14 Drawing Sheets

1300

RECEIVE A FIRST QUERY PLAN CORRESPONDING TO A QUERY AND A
JOIN ORDER HINT DESCRIBING A TARGET QUERY PLAN
1302

GENERATE A SECOND QUERY PLAN TO CORRECT A SET OF VERTICAL
POSITIONS OF A SET OF TERMINAL NODES OF THE FIRST QUERY PLAN
FOLLOWING THE JOIN ORDER HINT OF THE TARGET QUERY PLAN
1304

GENERATE A THIRD QUERY PLAN TO CORRECT A SET OF LATERAL
POSITIONS OF THE SET OF TERMINAL NODES OF THE SECOND QUERY
PLAN FOLLOWING THE JOIN ORDER HINT OF THE TARGET QUERY PLAN
1306

FOR EACH JOIN NODE FROM THE SET OF JOIN NODES OF THE THIRD
QUERY PLAN, INDICATE THAT EACH JOIN NODE HAS BEEN HINTED
1308

GENERATE, AFTER EACH JOIN NODE OF THE THIRD QUERY PLAN HAS
BEEN INDICATED AS BEING HINTED, THE TARGET QUERY PLAN BASED
AT LEAST IN PART ON THE THIRD QUERY PLAN
1310

*FIG. 13*

RULE BASED HINT APPLICATION

TECHNICAL FIELD

Embodiments of the disclosure relate generally to databases and, more specifically, to enabling techniques for responsive query plan stability in an online data system(s).

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

A cloud database is a network-based system used for data analysis and reporting that comprises a central repository of integrated data from one or more disparate sources. A cloud database can store current and historical data that can be used for creating analytical reports for an enterprise based on data stored within databases of the enterprise. To this end, data warehouses typically provide business intelligence tools, tools to extract, transform, and load data into the repository, and tools to manage and retrieve metadata.

When certain information is to be extracted from a database, a query statement may be executed against the database data. A cloud database system processes the query and returns certain data according to one or more query predicates that indicate what information should be returned by the query. The data warehouse system extracts specific data from the database and formats that data into a readable form.

BRIEF DESCRIPTION OF THE DRAWINGS

The present disclosure will be understood more fully from the detailed description given below and from the accompanying drawings of various embodiments of the disclosure.

FIG. 13 is flow diagram illustrating operations of a database system in performing a method, in accordance with some embodiments of the present disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Figure 1:
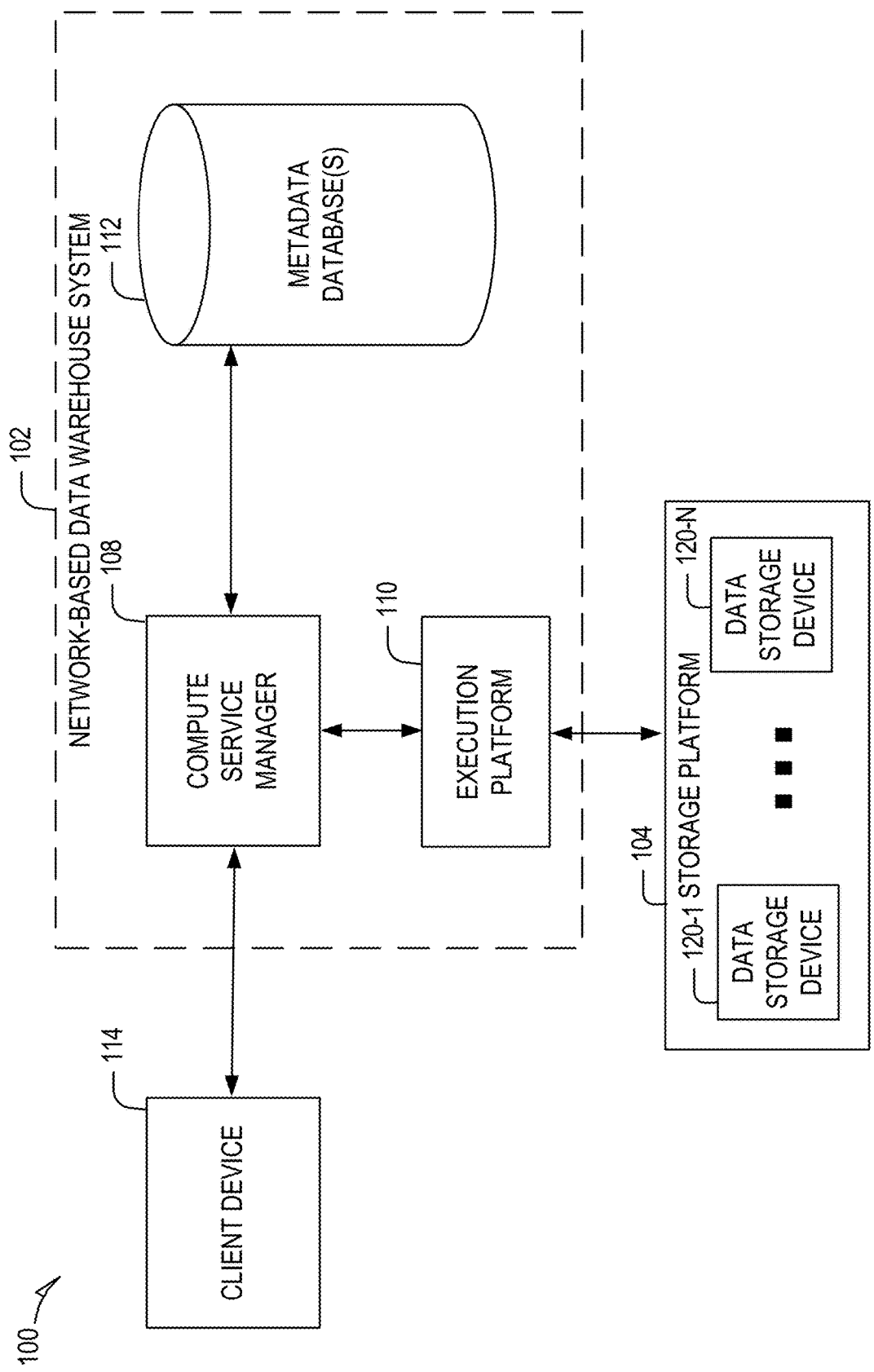
FIG. 1 illustrates an example computing environment that includes a network-based data warehouse system in communication with a cloud storage platform, in accordance with some embodiments of the present disclosure.

FIG. 1 illustrates an example computing environment 100 that includes a database system in the example form of a network-based data warehouse system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based data warehouse system 102 in communication with a cloud storage platform 104 (e.g., AWS®, Microsoft Azure Blob Storage®, or Google Cloud Storage. The network-based data warehouse system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data warehouse system 102.

The network-based data warehouse system 102 comprises a compute service manager 108, an execution platform 110, and one or more metadata databases 112. The network-based data warehouse system 102 hosts and provides data reporting and analysis services to multiple client accounts.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data warehouse system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based data warehouse system 102 and its users. For example, a metadata database(s) 112 may include a summary of data stored in remote data storage systems as well as data available from a local cache. Additionally, a metadata database(s) 112 may include information regarding how data is organized in remote data storage systems (e.g., the cloud storage platform 104) and the local caches. Information stored by a metadata database(s) 112 allows systems and services to determine whether a piece of data needs to be accessed without loading or accessing the actual data from a storage device.

In an embodiment, a data structure can be utilized for storage of database metadata in the metadata database(s) 112. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enable the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database(s) 112 includes EP files (expression property files), where each of the EP files store a collection of expression properties about corresponding data. Metadata may be stored for each column of each micro-partition of a given table. In an embodiment, the aforementioned EP files can be stored in a cache provided by the subject system for such EP files (e.g., "EP cache").

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database(s) 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
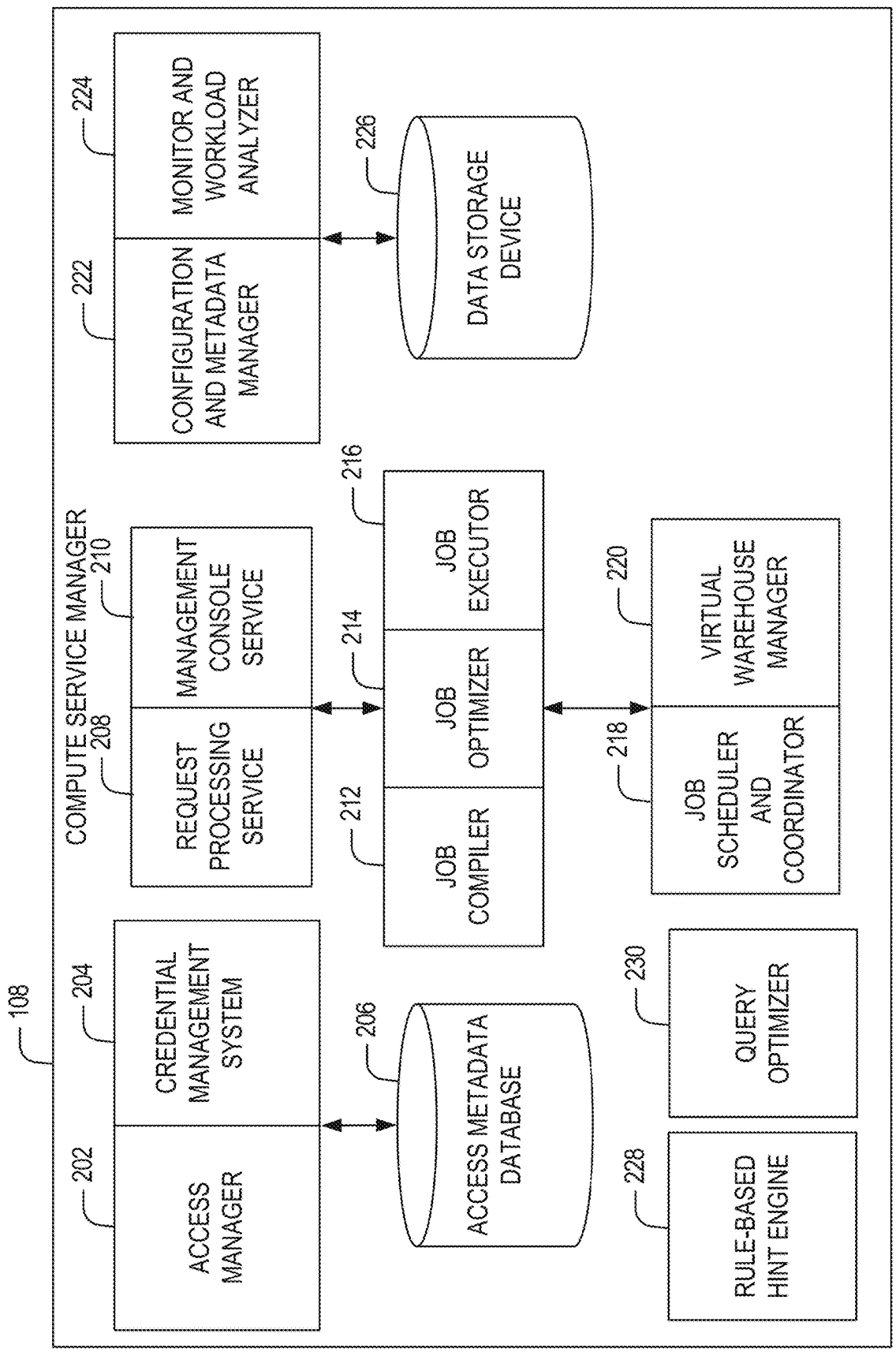
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. Alternatively or conjunctively, the job compiler 212 can generate query plans for executing received queries as discussed further herein.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

In data processing systems that support SQL, a hint is often used as a directive to provide instructions to the query optimizer on how to execute a SQL query. Hints can be used to direct a query optimizer to choose a join order, choose indexes or control other performance related options. As further illustrated, the compute service manager 108 includes a rule-based hint engine 228 and a query optimizer 230. In an example, the rule-based hint engine 228 implements a join order hint application framework that helps query optimizer 230 choose a particular join order, which enables achieving automatic responsive plan stability in the subject system.

Figure 3:
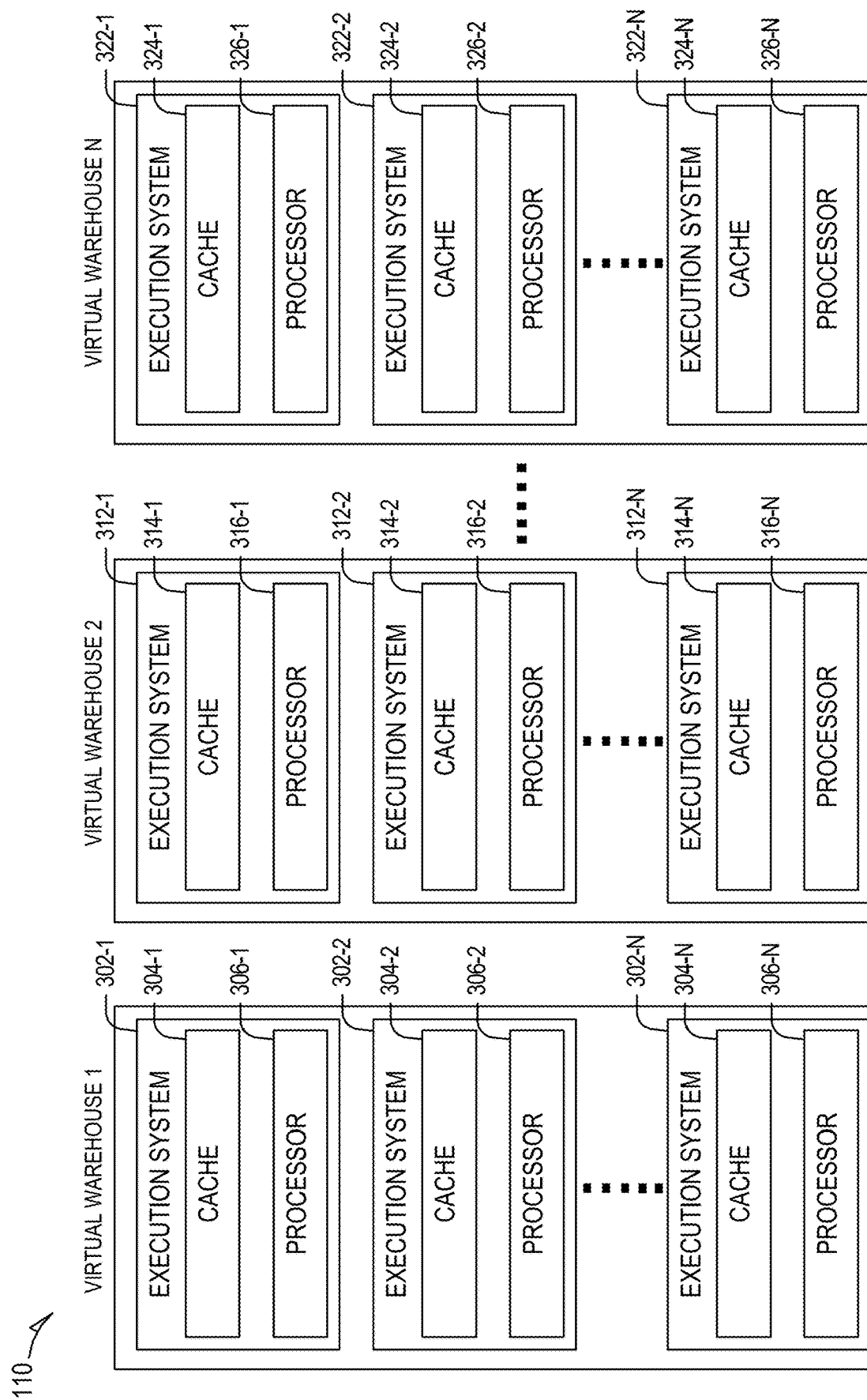
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted (e.g., shut down) when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without significantly impacting the performance observed by the existing users.

Figure 4:
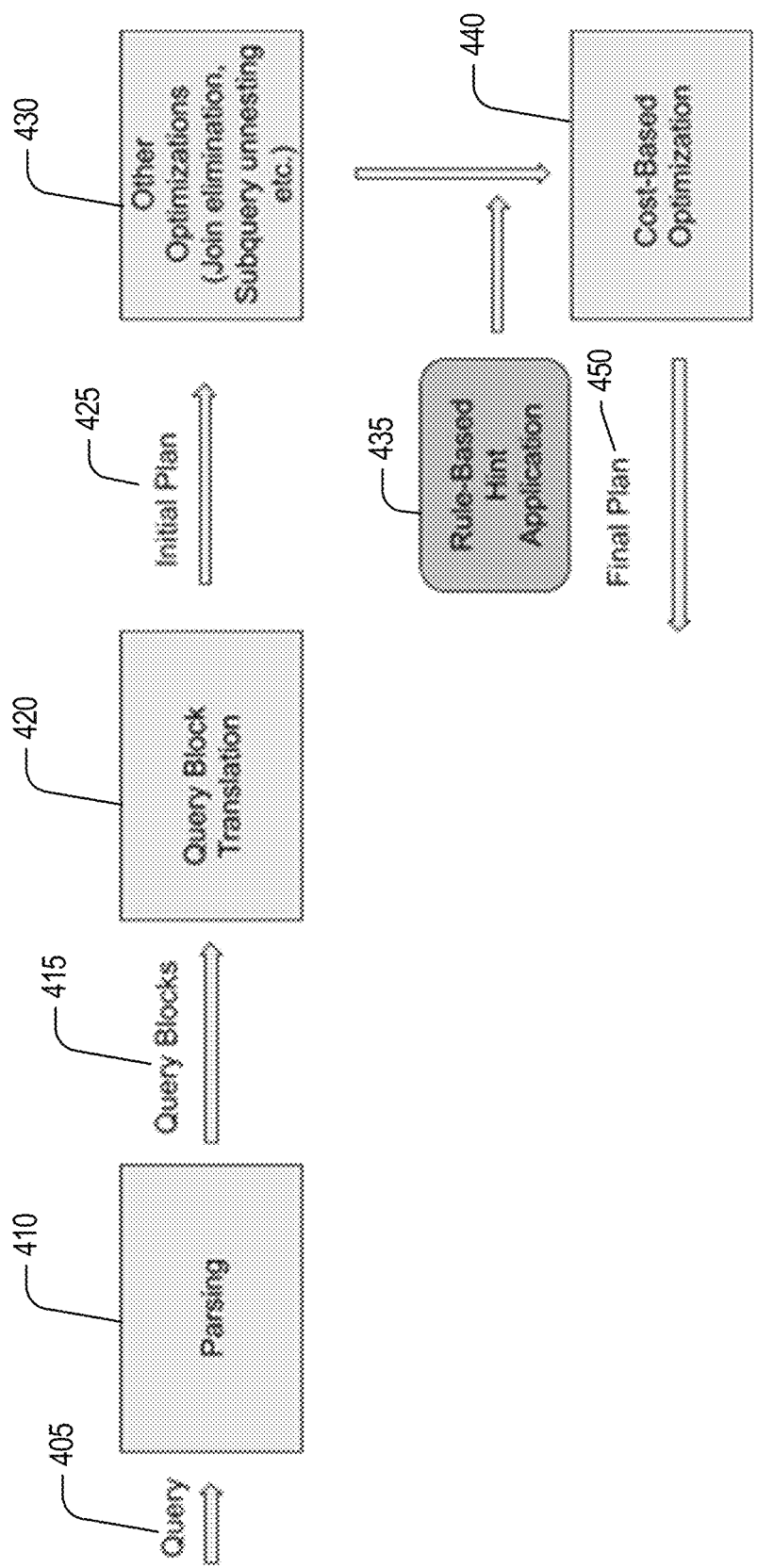
FIG. 4 illustrates an example processing flow for a set of operations of an example query compilation and query optimization involving a rule-based application, in accordance with some embodiments of the present disclosure.

FIG. 4 illustrates an example processing flow for a set of operations of an example query compilation and query optimization involving a rule-based application, in accordance with some embodiments of the present disclosure.

The following discussion relates to aspects of a rule-based hint application 435 (e.g., provided or enabled by rule-based hint engine 228).

In an implementation, join order hints can be applied any time before Cost-Based Optimization (CBO) (e.g., shown as cost-based optimization 440 in FIG. 4). CBO is an expensive step in query compilation, and is critical to choosing the final join order for a query. One fundamental goal of a hint application framework (e.g., provided by rule-based hint engine 228) is to skip this computationally expensive step.

An existing approach for join order hint application is to apply hints early in compilation at the time of Query Block (QB) translation (e.g., shown as query block translation 420 in FIG. 4) when initial query plan (e.g., initial plan 425) is constructed. One limitation of this approach is that joins introduced after QB translation are not easily supported within a given framework.

In contrast, rule-based hint application 435 applies relatively late in compilation just before CBO and overcomes the limitations of a given existing framework(s). Joins introduced after QB translation are supported within this framework. For example, this approach can support joins coming from subquery unnesting and apply hints to them.

Existing approaches typically follow a construction based approach. Hints are applied before or during the initial query plan is constructed (in a bottom up manner) from the QBs.
Input: Query Blocks
Output: Hinted Query Plan In contrast, rule-based hint application 435 employs a transformation based approach. For example, rule-based hint application 435 takes a query plan as input, applies predefined transformations or rules (commute, permute rules) present in an optimizer in a principled manner, and generates a hinted query plan corresponding to final plan 450.
Input: Query Plan with Initial Join Order
Output: Hinted Query Plan The following discussion relates to query blocks.

In a query compilation process shown in FIG. 4, a SQL query 405 after parsing 410 is usually broken into one or more smaller units called Query Blocks (QB) 415 where such query blocks undergo query block translation 420 to generate initial plan 425. Such QBs generally follow a tree structure, so each QB can have one or more child QBs. Each QB can be optimized independently (e.g., in other optimizations 430) before being combined to generate a complete execution plan for the query.

When discussing join order hint application, each QB can be thought of as an unit which contributes a portion or fragment in the query plan within which joins are reorderable.

The following discussion relates to join order hint syntax.

Each join node in a query plan generates a hint which is a key-value pair and follows a syntax like this:
  "qbx_y": {"leftAlias",
    "rightAlias"}
  x: Query Block (QB) identifier.
  y: Unique identifier for join nodes within a QB.
  leftAlias: Alias for the left child subtree of the join node.
  rightAlias: Alias for the right child subtree of the join node.

If there are B blocks, the QB identifiers range from 1 to B. If there are N joins in a QB, the join identifiers range from 0 to (N−1).

Additionally, a null alias is utilized to refer to the join-tree built so far within a QB. The nodes that contribute non-null aliases are called terminal nodes (also referred to as "terminals", "nodes with aliases" or simply "nodes").

There are two types of terminal nodes in a query plan:
Leaf Node: These are data source nodes in the query plan.
Query Block Root: These are root/top nodes of a QB, where QB refers to a fragment of the query plan within which joins are reorderable.

Consider the following example query:
WITH V1 AS (
SELECT*FROM T4, T5, T6
WHERE T4.c4=T5.c5 AND T5.c5=T6.c6 LIMIT 3)
SELECT*
FROM T1, T2, T3, V1
WHERE T1.c1=T2.c2 AND T2.c2=T3.c3 AND T3.c3=V1.c4;

Here the data sources are: T1, T2, T3, T4, T5, T6 and V1 refers to the root node (LIMIT operator) of the CTE query block.

A valid join order hint following our syntax could be:
{"qb1_0": ["T6", "T4"], "qb1_1": [null, "T5"], "qb2_0": ["V1", "T3"], "qb 2_1": ["T1", null], "qb2_2": [null, "T2"]}

The above join order hint actually describes the join order:
((T1, (((T6, T4), T5), T3)), T2)

The following discussion relates to rewrite rules.

Query compilers often rely on predefined transformations or rules. Such transformations or rules, applied in a principled manner, can be used to optimize a query plan. Rule-based hint application 435 utilizes rules used in a transformation-based query optimizer, repurposing them to achieve a join order hint application. After the query plan is processed by rule-based hint application (outputting a target query plan), a cost-based optimization 440 is skipped (e.g., forgoing performing such an optimization) which then generates a final plan 450.

Figure 5:
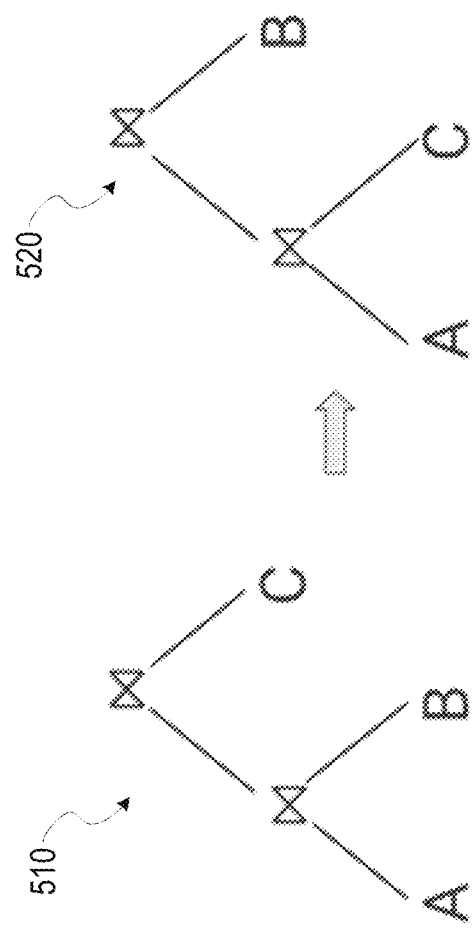
FIG. 5 illustrates an example of a join permute rule applied to a query plan in accordance with embodiments of the subject technology.

In an implementation, a hint application framework (e.g., provided by rule-based hint engine 228) relies on two rewrite rules which are discussed further below:
Join Permute Rule.
Join Commute Rule FIG. 5 illustrates an example of a join permute rule applied to a query plan in accordance with embodiments of the subject technology.

As shown, the join permute rule transforms a query plan 510 of the form ((A ⋈ B) ⋈ C) to a query plan 520 of form ((A ⋈ C) ⋈ B) if such a transformation is valid. The following should be considered:
Only the right child of join nodes participate in permute. B and C are the right child of their parent join nodes.
The permute increases the height of B and decreases the height of C, where height is measured from the bottom.
Height of A remains unchanged.

Figure 6:
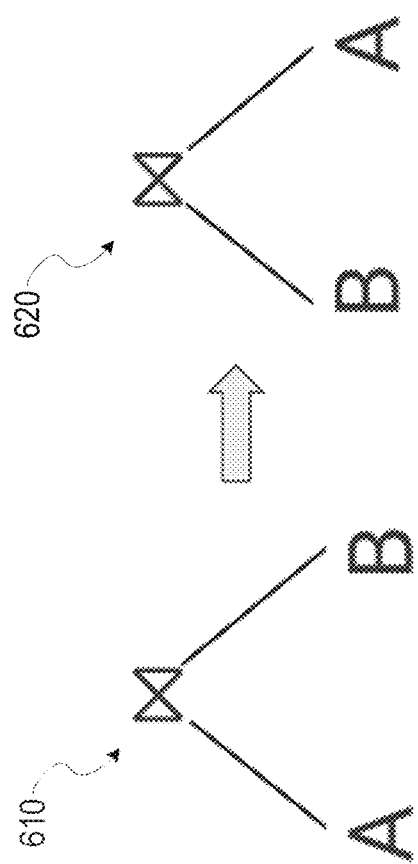
FIG. 6 illustrates an example of a join commute rule applied to a query plan in accordance with embodiments of the subject technology.

FIG. 6 illustrates an example of a join commute rule applied to a query plan in accordance with embodiments of the subject technology.

As shown, the join commute rule is a transformation that swaps the children of a join node while preserving the semantics. The join commute rule transforms a query plan 610 of the form (A ⋈ B) to a query plan 620 of a form (B ⋈ A) if such a transformation is valid.

The following discussion relates to various aspects involving rule-based application 435.

The following discussion relates to the inputs and outputs of rule-based hint application 435.

Figure 7:
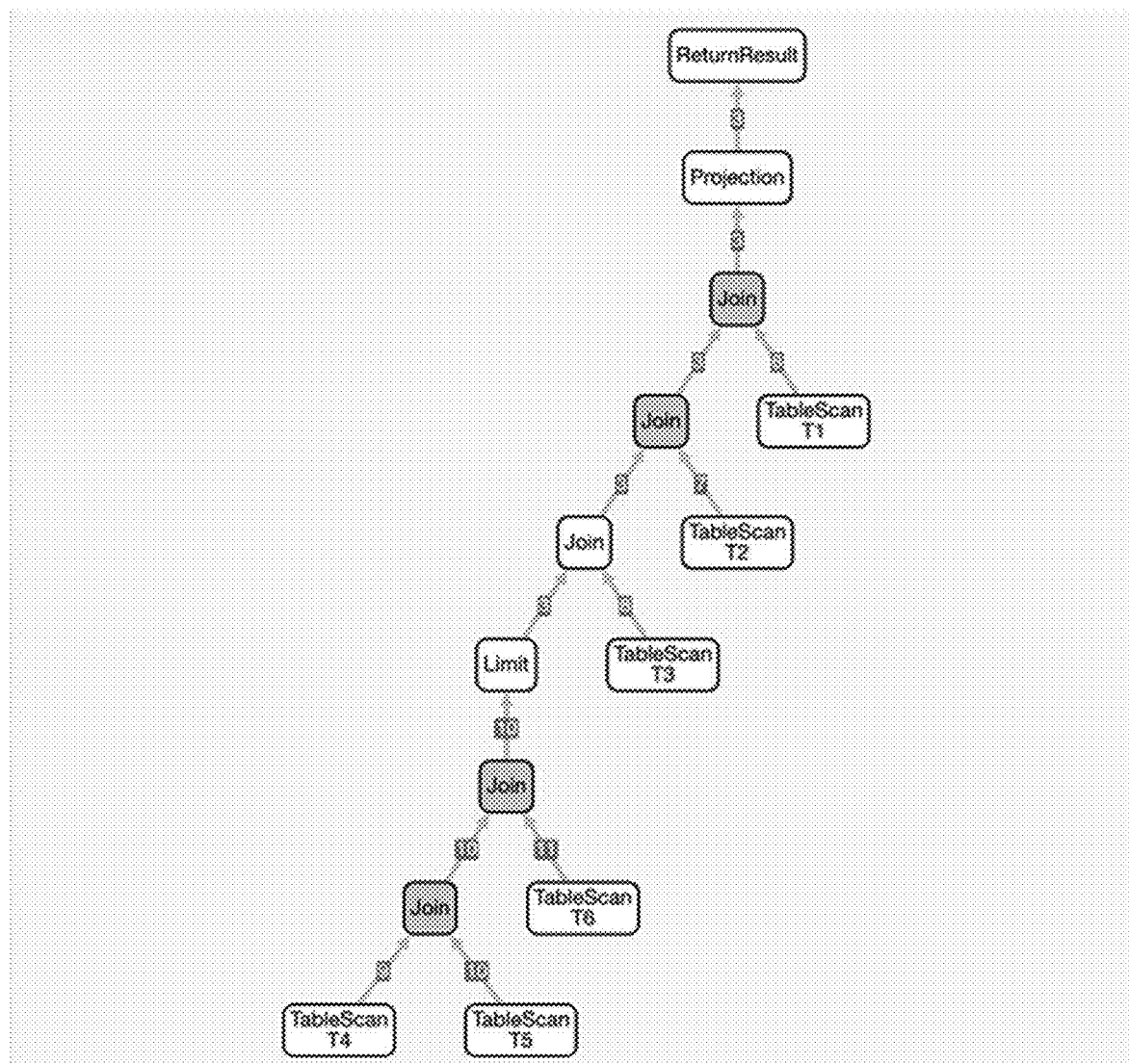
FIG. 7 illustrates an example of an input query plan with an arbitrary join order in accordance with embodiments of the subject technology.

FIG. 7 illustrates an example of an input query plan with an arbitrary join order in accordance with embodiments of the subject technology.

In an implementation, the hint application framework (e.g., provided by rule-based hint engine 228) takes as input:
A query plan with an initial join order and
A directive containing a valid join order hint describing the target query plan.

The framework applies the join order hint and outputs:
A query plan matching the specific join order instructed by the directive.

As shown, given an example query, the two inputs to rule-based hint application 435 are the following:
Query plan 700 with the initial join order: (((((T4, T5), T6), T3), T2), T1)
A directive containing a valid join order hint describing the target query plan:
{"qb1_0": ["T6", "T4"], "qb1_1": [null, "T5"], "qb2_0": ["V1", "T3"],
"qb2_1": ["T1",null], "qb2_2": [null, "T2"]}
The above join order hint describes the join order:
((T1, (((T6, T4), T5), T3)), T2)
The output from the framework is a query plan matching the described join order which is discussed in FIG. 8.

Figure 8:
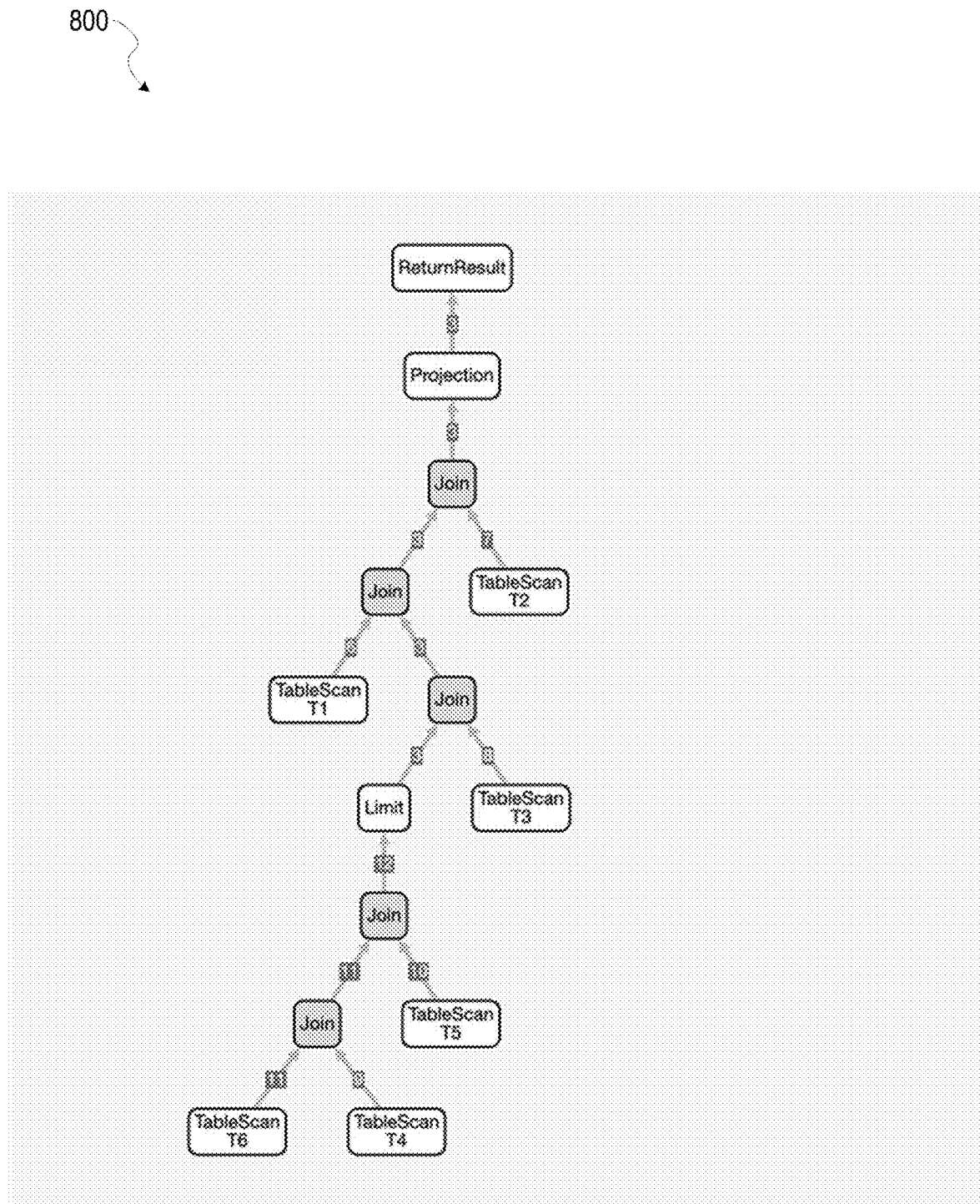
FIG. 8 illustrates an example of an output query plan matching a join order hint in accordance with embodiments of the subject technology.

FIG. 8 illustrates an example of an output query plan matching a join order hint in accordance with embodiments of the subject technology. The example in FIG. 8 continues the discussion from FIG. 7.

As shown, the expected output from rule-based hint application 435 is:
A target query plan 800 with the join order:
((T1, (((T6, T4), T5), T3)), T2)

In an implementation, the hint application framework is divided into logical steps or stages. The following discussion relates to such logical steps (or stages).

For join order hint processing, the hints in the plan directive are processed in sorted order. First, hints are sorted in the increasing order of QB identifiers. It is then further sorted, within each query block, in the increasing order of join identifiers.

The hints are processed in the sorted order to generate position metadata for each terminal node. The following metadata are maintained for terminal nodes:
Vertical Position (or Height): Height measured from the bottom.
Lateral position: Describes if a terminal is the left or right child of its parent join node.

The pair of vertical and lateral positions <Vertical, Lateral> uniquely identify the position of a terminal node in the target query plan. Moreover, the positions of a terminal node are made globally unique.

The following is an example algorithm (e.g., executed by rule-based hint application 435 or rule-based hint engine 228) to generate unique positions from directive:
Algorithm:
Initialize, curHeight=0.
Process hint fragments in the sorted order:
1. Assign curHeight as vertical position to terminals in the hint fragment.
Increment curHeight.
2. Assign lateral position to terminals.
Non-null leftAlias in the hint fragment is tagged Left Child.

Non-null rightAlias in the hint fragment is tagged Right Child.

Figure 9:
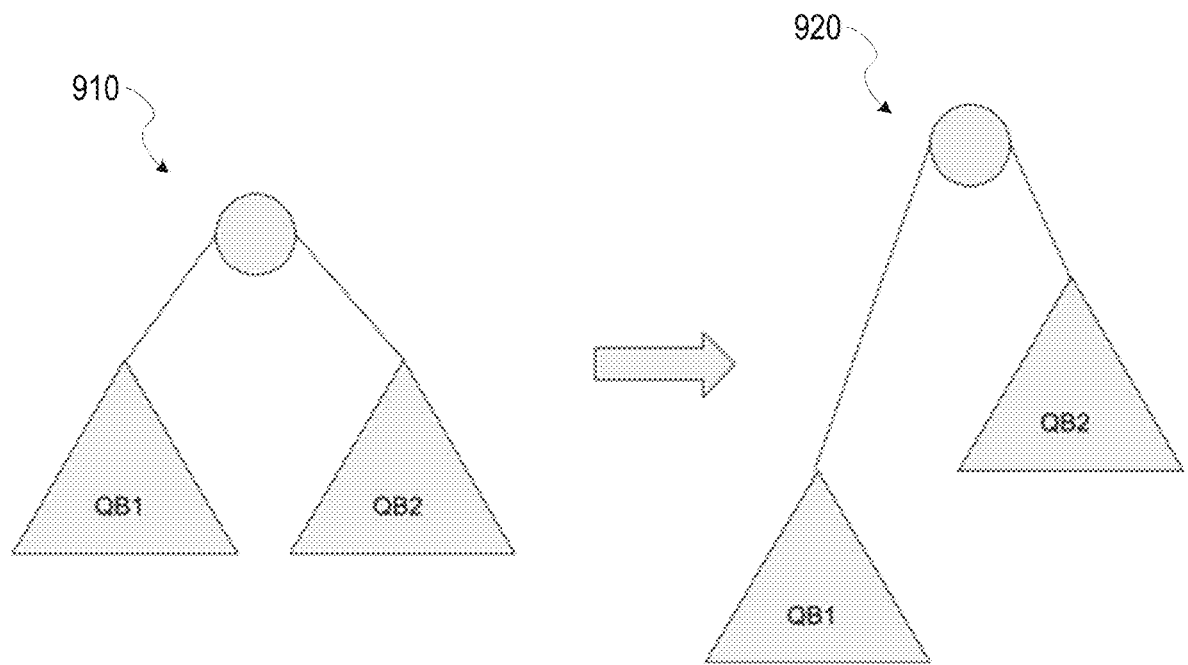
FIG. 9 illustrates an example of making vertical positions unique across an entire query plan in accordance with embodiments of the subject technology.

FIG. 9 illustrates an example of making vertical positions unique across an entire query plan in accordance with embodiments of the subject technology.

For some query plans, it might not be immediately clear how the (vertical) positions are globally unique. For example, root nodes of QB1 and QB2 are being joined together in a query plan 910.

As shown, to make vertical positions unique across the entire query plan, the aforementioned algorithm assigns terminals from QB2 greater heights than terminals in QB1 in query plan 920.

In an implementation, a set of internal metadata generated after processing the provided directive describing the target query plan, {"qb1_0": ["T6", "T4"], "qb1_1": [null, "T5"], "qb2_0": ["V1", "T3"], "qb2_1": ["T1", null], "qb2_2": [null, "T2"]}, can be represented by the following:

| Hint Fragment | Terminal Node with Alias | Vertical Position or Height | Lateral Position |
|---|---|---|---|
| "qb1_0":["T6","T4"] | T6 | 0 | Left Child |
|  | T4 | 0 | Right Child |
| "qb1_1":[null,"T5"] | T5 | 1 | Right Child |
| "qb2_0":["V1","T3"] | V1 | 2 | Left Child |
|  | T3 | 2 | Right Child |
| "qb2_1":["T1",null] | T1 | 3 | Left Child |
| "qb2_2":[null,"T2"] | T2 | 4 | Right Child |

The following discussion relates to Stage 1: Correct Vertical Positions (or Heights).

In such a first stage, a goal is to create a query plan where all terminal nodes (nodes with aliases) are placed in their correct vertical positions. The lateral positions of the terminal nodes may or may not be correct after this stage.

In an example, to place each terminal node in their correct vertical positions, the Join Permute Rule and the Join Commute Rule are applied when a set of conditions is met.
Join Permute Rule Conditions:
  Permute a plan fragment of the form (A ⋈ B) ⋈ C) to ((A ⋈ C) ⋈ B), under the following condition:
    Height of B is greater than the height of C.
  B and C are terminals (only terminals have vertical positions stored in the metadata). Since B is at a greater height than C in the target query plan, permuting them steers terminals towards their correct heights.
Join Commute Rule Conditions:
  Commute a plan fragment of the form (A ⋈ B) to (B ⋈ A), under the following condition:
    Height of A is greater than the height of B.
  A and B are terminals (only terminals have vertical positions in the metadata). A needs to go higher (than B) in the target plan. After the commute, A would become the right child and become eligible for permute. Subsequently, A can be permuted to its correct height using the Join Permute Rule.

Figure 10:
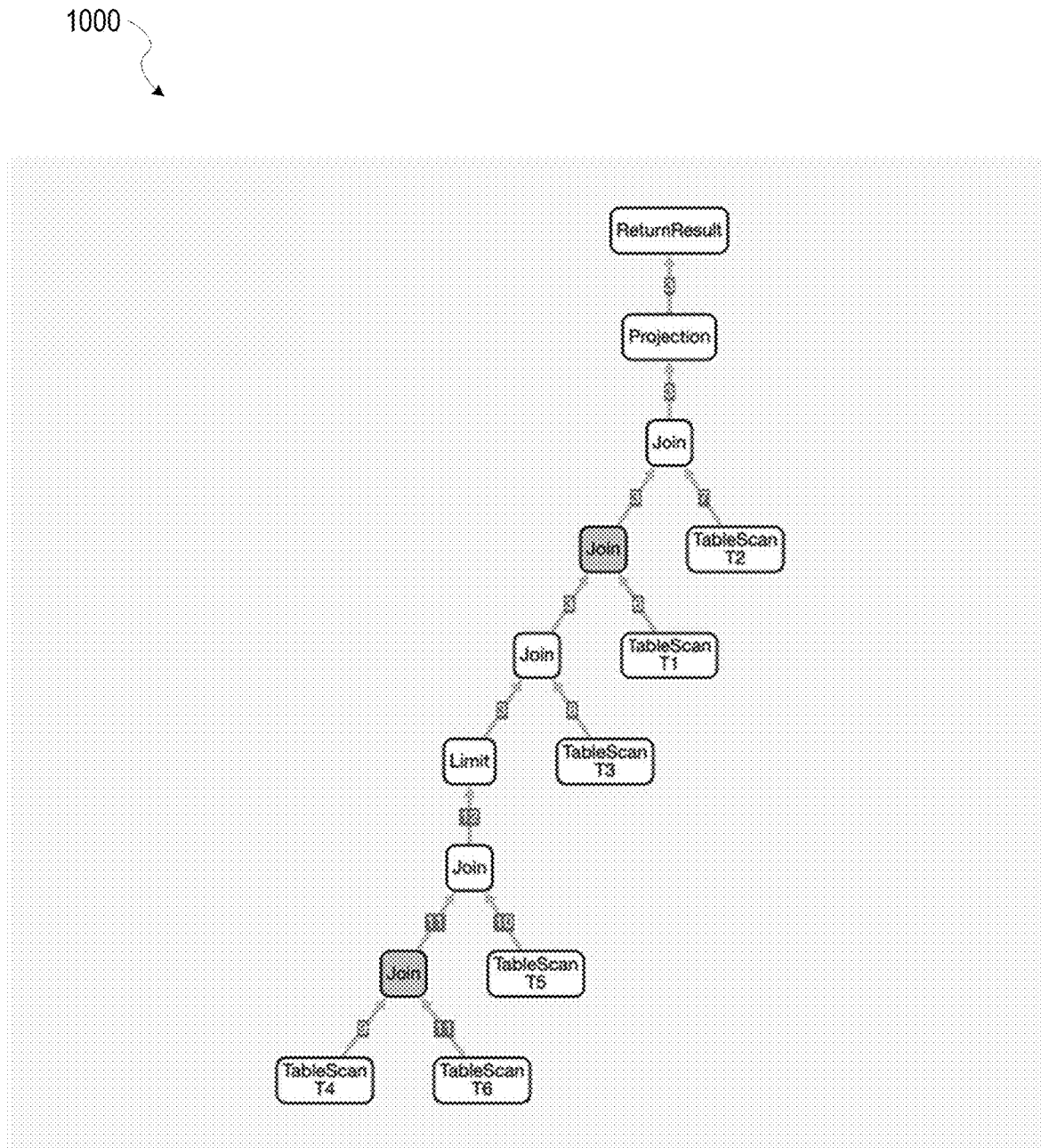
FIG. 10 illustrates an example of a query plan after a first stage of transformations in accordance with embodiments of the subject technology.

FIG. 10 illustrates an example of a query plan after a first stage of transformations in accordance with embodiments of the subject technology.

In the example of FIG. 10, a query plan 1000 is provided after transformations described above for Stage 1 are applied on the input query plan described and shown in FIG. 7. It can be noticed that all terminals are at the correct height corresponding to the target query plan. However, the terminal nodes T6, T4, and T1 are not in the correct lateral positions.

To correct such lateral positions, Stage 2: Correct Lateral Positions is discussed below.

In a second stage, a goal is to correct lateral positions of misplaced terminal nodes (if any). Since all nodes are already in the correct vertical positions, once lateral positions are corrected, the join order of the target query plan is achieved.

To place each terminal node in their correct lateral positions, the Join Commute Rule is applied when a set of conditions is met.
Join Commute Rule Conditions:
  Commute a plan fragment of the form (A ⋈ B) to (B ⋈ A), under the following condition:
    Commute a terminal with its sibling if the lateral position is incorrect.
  There can be a number of scenarios: A is a terminal and the lateral position of A is incorrect; or B is a terminal and the lateral position of B is incorrect. Since the commute rule does not alter heights, vertical positions will remain preserved. Only lateral positions would be corrected if needed.

Figure 11:
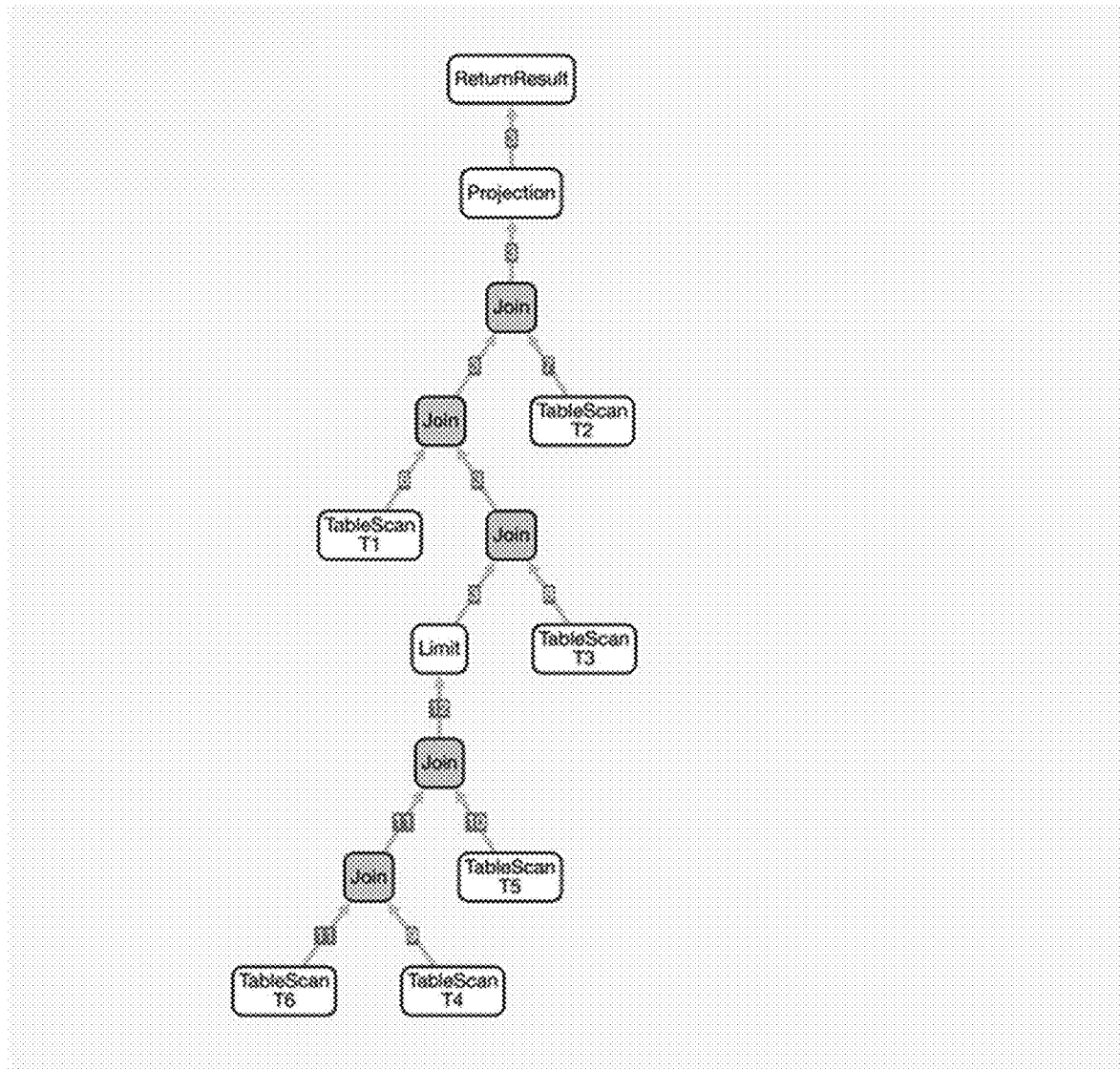
FIG. 11 illustrates an example of a query plan after a second stage of transformations in accordance with embodiments of the subject technology.

FIG. 11 illustrates an example of a query plan after a second stage of transformations in accordance with embodiments of the subject technology.

As shown, query plan 1100 includes lateral positions of the terminal nodes T6, T4, and T1 that are corrected in this second stage.

The following discussion relates to Stage 3: Mark Joins As Hinted.

Upon successful application of join order hints (in Stages 1 and 2 discussed above), the join nodes are marked as hinted in the final stage (e.g., third stage).

In a third stage, no transformations (permute or commute) are applied, only joins are marked as hinted, shown by a visual change (color change) in the join nodes of FIG. 12 as discussed below.

Figure 12:
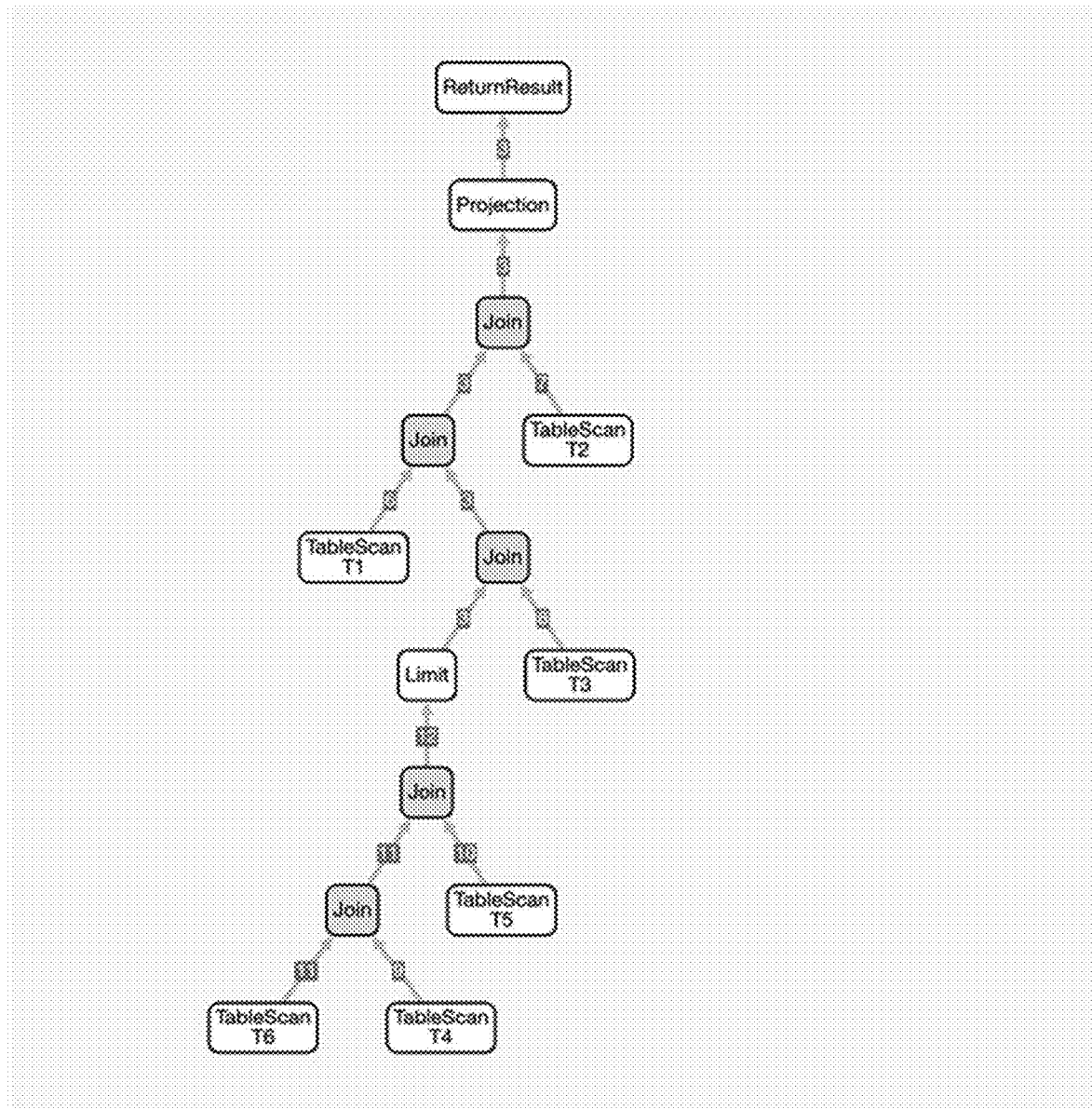
FIG. 12 illustrates an example of a query plan after joins are marked hinted in a third stage in accordance with embodiments of the subject technology.

FIG. 12 illustrates an example of a query plan after joins are marked hinted in a third stage in accordance with embodiments of the subject technology.

As shown, a final query plan 1200 matches the target query plan 800 with the target join order with all join nodes marked as hinted:
  ((T1, (((T6, T4), T5), T3)), T2)

This (Stage 3) ensures that any subsequent join order related optimization in the compiler (for example cost-based optimization, and the like) does not change the join order generated by rule-based hint application 435 and such expensive optimizations can often be completely skipped.

FIG. 13 is flow diagram illustrating operations of a database system in performing a method, in accordance with some embodiments of the present disclosure. The method 1300 may be embodied in computer-readable instructions for execution by one or more hardware components (e.g., one or more processors) such that the operations of the method 1300 may be performed by components of network-based data warehouse system 102, such as components of the compute service manager 108. Accordingly, the method 1300 is described below, by way of example with reference thereto. However, it shall be appreciated that the method 1300 may be deployed on various other hardware configurations and is not intended to be limited to deployment within the network-based data warehouse system 102.

At operation 1302, the rule-based hint engine 228 receives a first query plan corresponding to a query, the first query plan comprising a set of join nodes, and a join order hint of a target query plan, each join node of the target query plan associated with a hint. At operation 1304, the rule-based hint engine 228 generates a second query plan to correct a set of vertical positions of a set of terminal nodes of the first query plan following the join order hint of the target query plan. At operation 1306, the rule-based hint engine 228 generates a third query plan to correct a set of lateral positions of the set of terminal nodes of the second query plan following the join order hint of the target query plan. At operation 1308, the rule-based hint engine 228, for each join node from the set of join nodes of the third query plan, indicating that each join node has been hinted. At operation 1310, the rule-based hint engine 228 generates, after each join node of the third query plan has been indicated as being hinted, the target query plan based at least in part on the third query plan. In an embodiment, the rule-based hint engine 228 does not perform any operations involving bushy plans.

Figure 14:
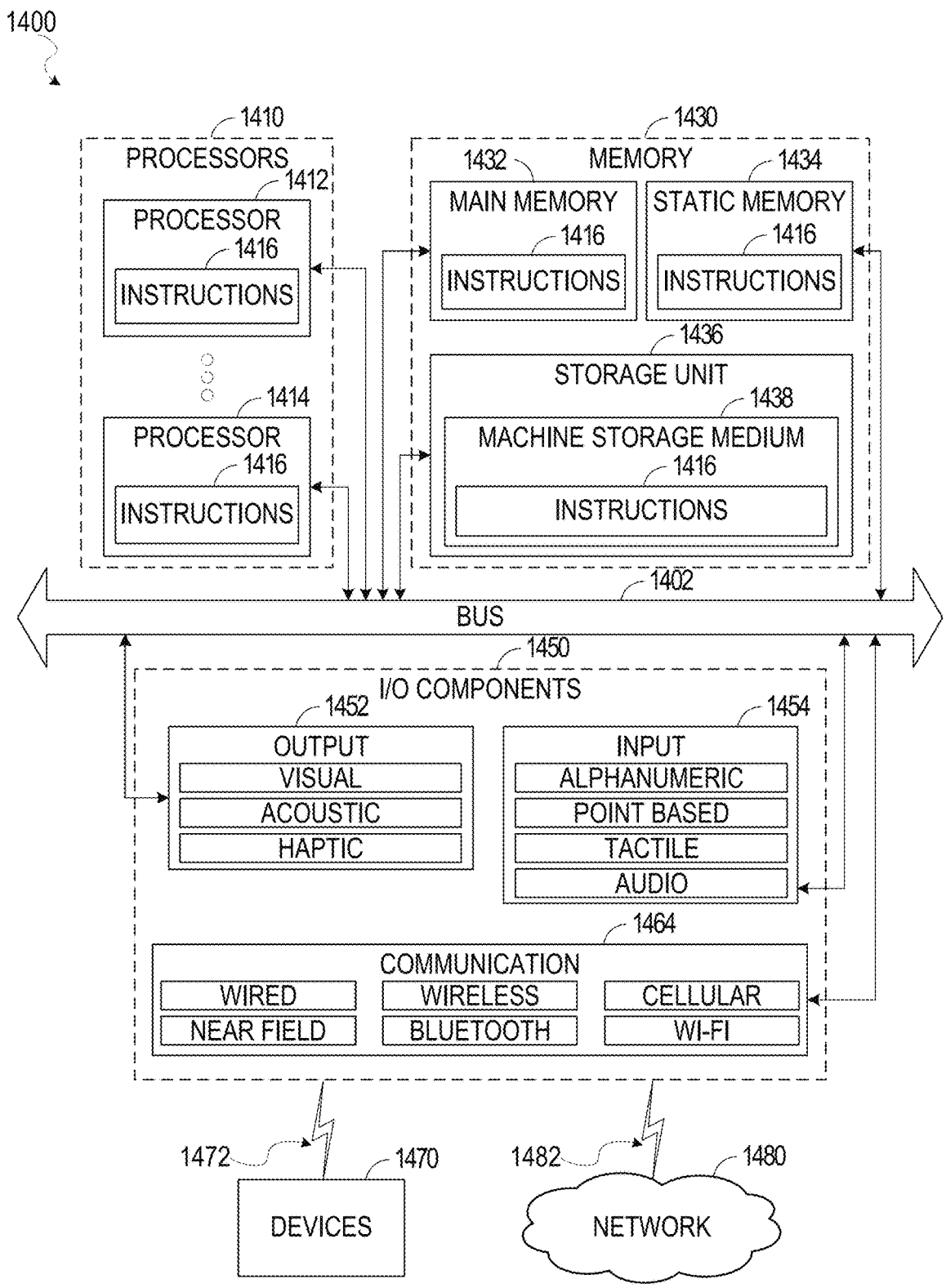
FIG. 14 illustrates a diagrammatic representation of a machine in the form of a computer system within which a set of instructions may be executed for causing the machine to perform any one or more of the methodologies discussed herein, in accordance with some embodiments of the present disclosure.

FIG. 14 illustrates a diagrammatic representation of a machine 1400 in the form of a computer system within which a set of instructions may be executed for causing the machine 1400 to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute any one or more operations of a method. In this way, the instructions 1416 transform a general, non-programmed machine into a particular machine 1400 (e.g., the compute service manager 108 or a node in the execution platform 110) that is specially configured to carry out any one of the described and illustrated functions in the manner described herein.

In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 includes processors 1410, memory 1430, and input/output (I/O) components 1450 configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors 1410 that may comprise two or more independent processors (sometimes referred to as "cores") that may execute instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiple cores, or any combination thereof.

The memory 1430 may include a main memory 1432, a static memory 1434, and a storage unit 1436, all accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within machine storage medium 1438 of the storage unit 1436, within at least one of the processors 1410 (e.g., within the processor's cache memory), or any suitable combination thereof, during execution thereof by the machine 1400.

The I/O components 1450 include components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, and other communication components to provide communication via other modalities. The devices 1470 may be another machine or any of a wide variety of peripheral devices (e.g., a peripheral device coupled via a universal serial bus (USB)). For example, as noted above, the machine 1400 may correspond to any one of the compute service manager 108 or the execution platform 110, and the devices 1470 may include the client device 114 or any other computing device described herein as being in communication with the network-based data warehouse system 102 or the cloud storage platform 104.

Executable Instructions and Machine Storage Medium

The various memories (e.g., 1430, 1432, 1434, and/or memory of the processor(s) 1410 and/or the storage unit 1436) may store one or more sets of instructions 1416 and data structures (e.g., software) embodying or utilized by any one or more of the methodologies or functions described herein. These instructions 1416, when executed by the processor(s) 1410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
a memory storing instructions that cause the at least one hardware processor to perform operations comprising:
receiving a first query plan corresponding to a query, the first query plan comprising a set of join nodes, and a join order hint of a target query plan, each join node of the target query plan associated with a hint;
generating a second query plan to correct a set of vertical positions of a set of terminal nodes of the first query plan following the join order hint of the target query plan, the generating the second query plan comprising:
processing the join order hint, the processing comprising:
sorting the join order hint based on an increasing order of query block identifiers; and
generating position metadata for each terminal node from the set of terminal nodes, the generating the position metadata comprising:
assigning a current height as a vertical position of a terminal node based on processing the join order hint in sorted order of query block identifiers;
incrementing the current height after assigning the vertical position to the terminal node; and
assigning a lateral position to the terminal node based on alias information from the join order hint, the lateral position indicating whether the terminal node is a left child or right child of a parent join node;
generating a third query plan to correct a set of lateral positions of the set of terminal nodes of the second query plan following the join order hint of the target query plan;
for each join node from the set of join nodes of the third query plan, indicating that each join node has been hinted;
generating, after each join node of the third query plan has been indicated as being hinted, the target query plan based at least in part on the third query plan;
in response to generating the target query plan after each join node of the third query plan has been indicated as being hinted, determining to forgo performing a cost-based optimization process for the query, the determining facilitating skipping a computationally expensive step in query compilation of the query; and
in response to determining to forgo performing the cost-based optimization, generating a final query plan, the final query plan comprising a hinted query plan based on the target query plan.

2. The system of claim 1, wherein the hint comprises a query block identifier of a query block, a unique identifier for join nodes within the query block, a first alias for a left child subtree of the join node, and a second alias for a right child subtree of the join node.

3. The system of claim 2, wherein the join order hint is based at least in part on the hint of each join node from the set of join nodes.

4. The system of claim 2, wherein the first alias comprises a null value, or the second alias comprises the null value.

5. The system of claim 1, wherein generating the second query plan to correct the set of vertical positions of the set of terminal nodes of the first query plan is based on a join permute rule and a join commute rule.

6. The system of claim 5, wherein the join permute rule is applied based on a first set of conditions, and the join commute rule is applied based on a second set of conditions.

7. The system of claim 1, wherein generating the third query plan to correct the set of lateral positions of the set of terminal nodes of the second query plan is based on a particular join commute rule.

8. The system of claim 7, wherein the particular join commute rule is applied based on a particular set of conditions.

9. A method comprising:
receiving, by a hardware processor, a first query plan corresponding to a query, the first query plan comprising a set of join nodes, and a join order hint of a target query plan, each join node of the target query plan associated with a hint;
generating, by the hardware processor, a second query plan to correct a set of vertical positions of a set of terminal nodes of the first query plan following the join order hint of the target query plan, the generating the second query plan comprising:
processing, by the hardware processor, the join order hint, the processing comprising:
sorting, by the hardware processor, the join order hint based on an increasing order of query block identifiers; and
generating, by the hardware processor, position metadata for each terminal node from the set of terminal nodes, the generating the position metadata comprising:

assigning, by the hardware processor, a current height as a vertical position of a terminal node based on processing the join order hint in sorted order of query block identifiers;

incrementing, by the hardware processor, the current height after assigning the vertical position to the terminal node; and assigning, by the hardware processor, a lateral position to the terminal node based on alias information from the join order hint, the lateral position indicating whether the terminal node is a left child or right child of a parent join node;

generating, by the hardware processor, a third query plan to correct a set of lateral positions of the set of terminal nodes of the second query plan following the join order hint of the target query plan;

for each join node from the set of join nodes of the third query plan, indicating, by the hardware processor, that each join node has been hinted;

generating, after each join node of the third query plan has been indicated as being hinted, the target query plan, by the hardware processor, based at least in part on the third query plan; and in response to generating the target query plan after each join node of the third query plan has been indicated as being hinted, determining, by the hardware processor, to forgo performing a cost-based optimization process for the query, the determining facilitating skipping a computationally expensive step in query compilation of the query.

10. The method of claim 9, wherein the hint comprises a query block identifier of a query block, a unique identifier for join nodes within the query block, a first alias for a left child subtree of the join node, and a second alias for a right child subtree of the join node.

11. The method of claim 10, wherein the join order hint is based at least in part on the hint of each join node from the set of join nodes.

12. The method of claim 10, wherein the first alias comprises a null value, or the second alias comprises the null value.

13. The method of claim 9, wherein generating the second query plan to correct the set of vertical positions of the set of terminal nodes of the first query plan is based on a join permute rule and a join commute rule.

14. The method of claim 13, wherein the join permute rule is applied based on a first set of conditions, and the join commute rule is applied based on a second set of conditions.

15. The method of claim 9, wherein generating the third query plan to correct the set of lateral positions of the set of terminal nodes of the second query plan is based on a particular join commute rule.

16. The method of claim 15, wherein the particular join commute rule is applied based on a particular set of conditions.

17. A non-transitory computer-storage medium comprising instructions that, when executed by one or more processors of a machine, configure the machine to perform operations comprising:

receiving a first query plan corresponding to a query, the first query plan comprising a set of join nodes, and a join order hint of a target query plan, each join node of the target query plan associated with a hint;

generating a second query plan to correct a set of vertical positions of a set of terminal nodes of the first query plan following the join order hint of the target query plan, the generating the second query plan comprising:

processing the join order hint, the processing comprising:

sorting the join order hint based on an increasing order of query block identifiers; and generating position metadata for each terminal node from the set of terminal nodes, the generating the position metadata comprising:

assigning a current height as a vertical position of a terminal node based on processing the join order hint in sorted order of query block identifiers;

incrementing the current height after assigning the vertical position to the terminal node; and assigning a lateral position to the terminal node based on alias information from the join order hint, the lateral position indicating whether the terminal node is a left child or right child of a parent join node;

generating a third query plan to correct a set of lateral positions of the set of terminal nodes of the second query plan following the join order hint of the target query plan;

for each join node from the set of join nodes of the third query plan, indicating that each join node has been hinted;

generating, after each join node of the third query plan has been indicated as being hinted, the target query plan based at least in part on the third query plan; and in response to generating the target query plan after each join node of the third query plan has been indicated as being hinted, determining to forgo performing a cost-based optimization process for the query, the determining facilitating skipping a computationally expensive step in query compilation of the query.

18. The non-transitory computer-storage medium of claim 17, wherein the hint comprises a query block identifier of a query block, a unique identifier for join nodes within the query block, a first alias for a left child subtree of the join node, and a second alias for a right child subtree of the join node.

19. The non-transitory computer-storage medium of claim 18, wherein the join order hint is based at least in part on the hint of each join node from the set of join nodes.

20. The non-transitory computer-storage medium of claim 18, wherein the first alias comprises a null value, or the second alias comprises the null value.

21. The non-transitory computer-storage medium of claim 17, wherein generating the second query plan to correct the set of vertical positions of the set of terminal nodes of the first query plan is based on a join permute rule and a join commute rule.

22. The non-transitory computer-storage medium of claim 21, wherein the join permute rule is applied based on a first set of conditions, and the join commute rule is applied based on a second set of conditions.

23. The non-transitory computer-storage medium of claim 17, wherein generating the third query plan to correct the set of lateral positions of the set of terminal nodes of the second query plan is based on a particular join commute rule.

24. The non-transitory computer-storage medium of claim 23, wherein the particular join commute rule is applied based on a particular set of conditions.

25. The system of claim 1, wherein the position metadata makes vertical positions globally unique across an entire query plan by assigning terminals from different query blocks different height ranges.

26. The system of claim 1, wherein processing the join order hint comprises processing hint fragments in sorted order, wherein each hint fragment corresponds to a specific query block identifier and join identifier combination.

* * * * *